United States Patent [19]
Ruehle

[11] 3,708,755
[45] Jan. 2, 1973

[54] SELF ADJUSTING BRIDGE CIRCUIT WITH NEGATIVE FEEDBACK

[76] Inventor: Robert A. Ruehle, 5594 East Jefferson, Denver, Colo. 80237

[21] Appl. No.: 111,371

Related U.S. Application Data

[63] Continuation-in-part of Ser. No. 878,982, , which is a continuation of Ser. No. 577,294.

[52] U.S. Cl. .................. 330/28, 324/99 R, 330/105, 330/146
[51] Int. Cl. .............................................. H03f 1/08
[58] Field of Search ...................... 330/105, 146, 28; 324/98–100; 323/75 E, 75 N; 328/208

[56] References Cited

UNITED STATES PATENTS 3,344,283  9/1967  Stubbs ............................ 324/98 X
3,161,821  12/1964  Price et al. ........................ 323/75

Primary Examiner—Roy Lake
Assistant Examiner—James B. Mullins
Attorney—Anderson, Spangler & Wymore

[57] ABSTRACT

A self adjusting bridge circuit having a source of DC electrical power connected across two opposing corners of the bridge and having a first amplifier whose input circuit is interconnected across the other two opposing corners of the bridge wherein the output of the said first amplifier is connected to the input of a feedback amplifier, the output of which is connected back to one of said points of connection between the bridge and the input of the first amplifier, and wherein the current feedback from the feedback amplifier introduces negative feedback into the bridge.

4 Claims, 2 Drawing Figures

PATENTED JAN 2 1973    3,708,755

INVENTOR
ROBERT A. RUEHLE
BY
Anderson, Spangler & Seymore
ATTORNEY

SELF ADJUSTING BRIDGE CIRCUIT WITH NEGATIVE FEEDBACK

This application is a continuation in part of my previously filed application, Ser. No. 878,982 which was a continuation of my application, Ser. No. 577,294.

The present invention relates generally to electronic measuring and instrumentation devices and more specifically to a bridge circuit employing negative feedback means to effect a self adjustment in the bridge circuit and to provide an output which is a linear function of the unbalancing inputs to the bridge.

Electrical bridge circuits consisting fundamentally of a power source in parallel with a pair of parallel connected voltage dividers and having a galvanometer or other detector interconnecting points intermediate the ends of the two dividers have found considerable use in the past as measuring and instrumentation tools, especially where accuracy is required. Certain adaptations and sophistications of the fundamental circuit have been used as impedance measuring instruments as well as high quality thermometers and similar devices which provide an output as a function of the characteristic change of one leg, or portion of a divider, in the bridge circuit. The resistance variation of a temperature sensitive metal such as platinum is the basis for one such type of electrical thermometer. These basic techniques and the apparatus therefor are of course still valid and in use, however, the present day trend toward module type components, miniaturization and increased accuracy over wider ranges and in more severe environments has created problems and difficulties which the fundamental aspects of the prior art cannot overcome. It is therefore the principal object of the present invention to provide a novel circuit of the bridge type whose components lend themselves to miniaturization and whose accuracy and linearity is extremely high.

Another basic object of the invention is to provide a bridge circuit which is self adjusting and which will provide either current or voltage output signals which are linearly proportional to the condition or characteristic being measured.

A further object of the present invention is to provide a bridge circuit having the inherent advantages of negative feedback.

A still further advantage of the basic circuit of the present invention is its adaptability to many uses and applications.

Other and still further objects, features and advantages will become apparent from a reading of the following specification of the inventive circuit taken in conjunction with the accompanying drawings in which.

Briefly, the basic circuit of the invention includes a bridge network comprising a power source connected in parallel with two parallel voltage dividers and having a detector amplifier whose input circuit interconnects intermediate points in each of the voltage dividers. The circuit further includes a second or feedback amplifier whose input is connected to the output of the first mentioned amplifier and whose output is fed back to one leg of the bridge and also to an output circuit.

Figure 1:
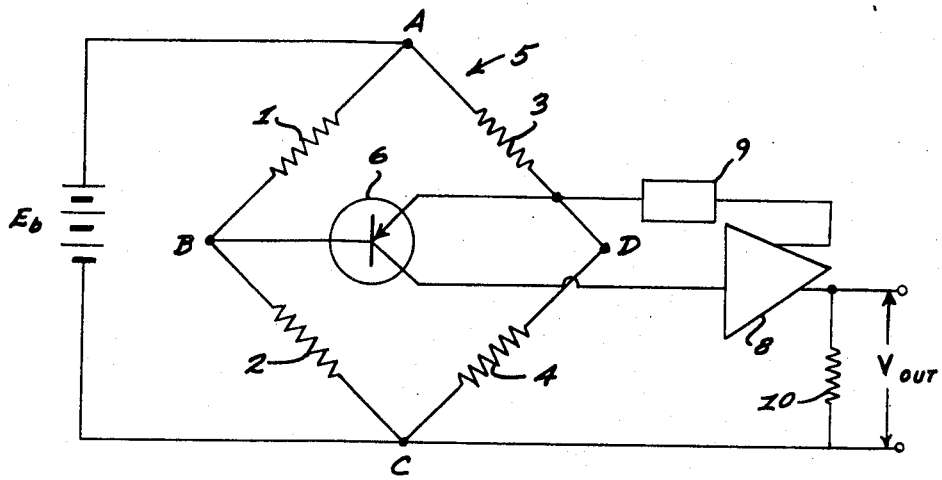
FIG. 1 is a schematic diagram of the circuit of the present invention with the feedback means shown in block diagram form.

With reference to the circuit of FIG. 1 the bridge is defined as being balanced when the voltage drop across leg 1 equals the sum of the voltage drop across leg 3 plus the voltage drop across the means interconnecting points B and D.

$$V_{AB} = V_{AD} + V_{DB} \qquad \text{(Eq. 1)}$$

Thus, using this definition of bridge balance it will be noted that the bridge is balanced even though the voltage levels at points D and B may be different or current flows between D and B. The definition of bridge balance as commonly accepted in the art would require $V_{DB}$ of (Eq. 1) to be zero and therefore the common definition would satisfy (Eq. 1), but the definition used in this application would also include a broader case where current flows between points D and B.

Upon the occurance of any event which upsets the equality of the balancing conditions, the change in current flow between points B and D will be amplified by the action of a transistor 6 and its output will be fed to the feedback amplifier 8 whose output is directed through one of the legs 3 of the bridge circuit 5 in order to change the voltage drop thereacross ($V_{AD}$) and to reestablish the equality of (Eq. 1), restoring the defined balance to the circuit. At the same time, the feedback amplifier output appears across an output circuit 10 for use in operating instrumentation circuitry (not shown) whose purpose it is to indicate or record an electrical quantity proportional to the condition causing bridge unbalance such as temperature, amount of resistance, etc.

Figure 2:
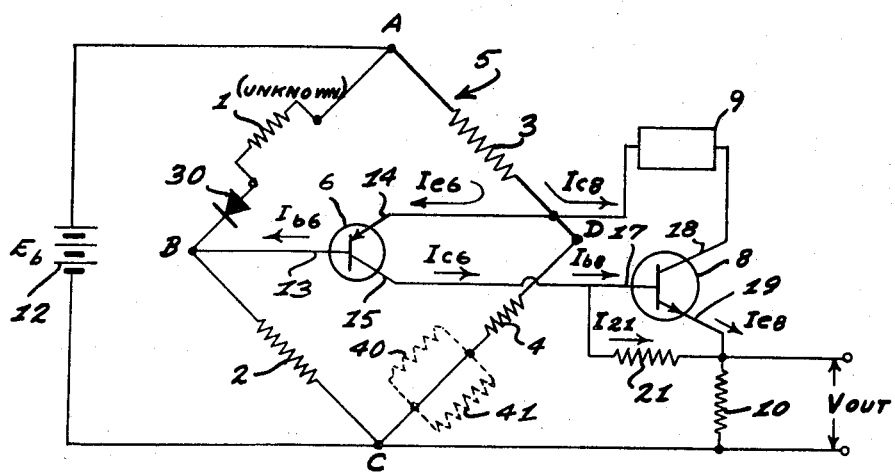
FIG. 2 is a schematic diagram of the circuit of the present invention with one temperature compensating network shown in phantom.

For a more detailed explanation of the circuit of the present invention and its operation, reference is made to FIG. 2 which schematically depicts the basic circuit of the invention employed as an ohmmeter. A battery 12 is connected in electrical parallel with a pair of parallel connected voltage dividers, each divider comprising two legs 1, 2 and 3, 4 of the total bridge network. The leg 1 may be the unknown resistance whose value it is the purpose of the circuit to determine. Interconnecting intermediate points B and D of the two dividers are the base-emitter terminals 13 and 14 of a PNP transistor 6. The collector 15 of the transistor 6 is connected to the base 17 of the feedback amplifier transistor 8. Point D of the bridge 5, intermediate resistance legs 3 and 4, is electrically connected to the output of the feedback amplifier 8 which is the collector terminal 18. The emitter 19 of the NPN transistor 8 is connected to one side of the output circuit resistor 10 whose other end is connected to the negative terminal of the D.C. power source 12. The feedback amplifier circuit also includes a resistance 21 across the base-emitter connections 17, 19 of the amplifier transistor 8.

The theory of operation may best be explained by developing the voltage equation (Eq. 1) around the loop ABD and then consider the effect of a change in the resistance R of leg 1. The mathematical development of (Eq. 1) results in the equivalent but different expression:

$$V_{AB} = V_{AD} + V_{eb6} + I_{b6} R_{eb6} \qquad \text{(Eq. 2)}$$

where:
$V_{AB}$ = The voltage drop from point A to point B
$V_{AD}$ = The voltage drop from point A to point D
$V_{eb6}$ = The emitter-base offset voltage of transistor 6
$I_{b6}$ = Base current of transistor 6
$R_{eb6} = (1 + \beta_6) R_{e6} + R_{b6}$ where
- $\beta$ = amplification factor of transistor 6
- $R_{e6}$ = emitter resistance of transistor 6
- $R_{b6}$ = base resistance of transistor 6

A change of resistance R of the resistor 1 results in a change of the voltage $V_{AB}$ dropped across that resistor and consequently a change in the base current $I_{b6}$ of the detector transistor 6. The change in base current is amplified by a factor equal to the transistor amplification factor, resulting in proportional change in collector current $I_{c6}$. This collector current divides between the base 17 of the feedback amplifier 8 and the shunt resistance 21. Since the current $I_{21}$ through the resistance 21 is a function of the resistance value and the base-emitter voltage drop in the feedback amplifier, it is desirable to choose a value for $R_{21}$ that will cause the current $I_{21}$ therethrough to be much greater than the base current $I_{b8}$ in order that the said base current will be inconsequential in the determination of the detector transistor 6 collector current. The collector current $I_{c6}$ then is proportional to the base-emitter voltage of the feedback amplifier and inversely proportional to the value of $R_{21}$ plus the amplification of the change of base current $I_{b6}$. By further mathematical development, it will be apparent to those skilled in the art that the collector current $I_{c8}$ of the feedback amplifier, which also flows through the resistance of leg 3 of the bridge 5, is equal to the product of the amplification factors of both transistors 6 and 8 and the change of base current $I_{b6}$ produced by a change of value of $R_1$. It can further be shown that the change of collector current $I_{c8}$ produced by the change of $R_1$ will result in a change of voltage drop $V_{AD}$ across the resistance $R_3$ which will equal the change of voltage drop $V_{AB}$ across $R_1$ and maintain the circuit in balance as defined by (Eq. 1). The emitter current $I_{e8}$ combined with the resistor current $I_{21}$ produce an output voltage $V_{out}$ across the output load resistor 10 which is proportional to the change in value of the resistor $R_1$. Other and further applications, such as temperature, pressure or strain gauges, can be developed from the basic circuit by those familiar with the art by making the bridge resistor $R_1$ an element which is resistance sensitive to the desired parameter.

In addition to or in place of the output resistance 10, a current sensitive device 9, could be placed in series with the collector circuit of the feedback amplifier if such measurement were necessary or desirable to determine the value of the variable being sought.

Unless temperature sensitivity of the circuit is desirable, as in the case of thermometers, it may well be undesirable and should be corrected for. The diode 30 shown in the circuit of FIG. 2 acts to achieve temperature compensation. The diode 30 which is in series with the resistance $R_1$ of the bridge 5 is selected so as to have as nearly as possible the same temperature coefficient as the detector transistor 6 and is physically mounted in close proximity thereto in order to be subjected to the same temperatures. If the change in voltage drop across the diode 30 (and consequently the voltage change from points A to B) is equal to the change of emitter-base voltage in the detector transistor, then the expression of (Eq. 1) holds and the circuit remains in the defined balance in spite of temperature changes.

An alternate method of temperature compensation is shown by the dotted lines of FIG. 2. Instead of matching changes in emitter-base voltage of the detector transistor by an equal change in $V_{AB}$, a thermistor 40 is provided in series with $R_4$ of the bridge to compensate for transistor sensitivity. The thermistor 40 also must be physically mounted in close proximity to the transistor 6. As a practical matter, the thermistor alone in series with the resistance $R_4$ creates excessive changes in $V_{AD}$ and therefor another resistor 41 is placed in parallel with the thermistor, the value of resistor 41 being such as to make any change in $V_{AD}$ equal to the emitter-base voltage change of the detector transistor due to temperature change, actually, it has been found that a combination of both temperature compensating techniques provides the best result.

Previous mention has been made in this specification of the possible uses of the circuit as a thermometer by the employment of such elements as platinum, nickel, tungsten, etc., as temperature probes and where such elements are made to become the resistance of leg 1 of the bridge 5. As also pointed out earlier, these elements have been used for such purposes for many years but with a serious disadvantage. The change of temperature of the probe material changes the temperature coefficient and causes a non-linear change of resistance with temperature. For extreme temperatures, continued use will have to be made of the temperature probe using the aforementioned materials and the disadvantage will continue, however, the circuit of the present invention provides relief from this disadvantage in the temperature range above −60° C. By utilizing the temperature sensitivity of the emitter-base offset voltage of the detector transistor, an exceptionally linear temperature to voltage relationship is obtained. It is an established fact that the emitter to base offset voltage of a transistor is a function of temperature, base current, and collector current. The temperature coefficient is a function of both the base and collector currents so that if a linear change in $V_{eb}$ is required, the base and collector currents must be held relatively constant. Previous attempts to use the temperature dependance of the emitter-base junction voltage of a transistor as a means of measuring temperature have been less than satisfactory because they have depended on large changes of collector current to provide an output signal. This large change of collector current causes the temperature coefficient to vary and therefore the outputs obtained have not borne a linear relationship to the temperature being measured.

In the present circuit these difficulties are overcome. With the values of the bridge resistances being fixed along with the supply voltage source 12 it will be seen that a change of $V_{AD}$ equals a negative change in $V_{DB}$. By considering the relationship between the equivalent values of resistance, current and transistor voltages which make up $V_{DB}$ and $V_{AD}$ and by mathematically developing the relationships of transistor temperatures differences and temperature coefficients, it may be seen that the output voltage $E_o$ equals the temperature coefficient of the transistor times the ratio of R10 to R3 times the difference in temperature of the detector transistor.

The temperature coefficient of the transistor 6 is held constant by the feedback which keeps the circuit balanced according to (Eq. 1), that is a change in $V_{eb6}$ is followed by an equal and opposite change in $V_{AD}$ which in turn prevents any appreciable change in $I_{b6}$, (assuming that the amplification factors of the transistors are sufficiently large to make this statement true). A constant base current $I_{b6}$ will maintain a constant collector current $I_{c6}$. With the temperature coefficient constant, the output voltage $V_{out}$ is exactly proportional to temperature of the detector transistor 6.

In view of the fact that transistor amplification factors are drastically reduced when the emitter-base junction is subjected to temperatures of less than about $-60°$ C., the above described method will not work and resistive temperature probes must be utilized. Further, resistive heating means must be employed in a thermal circuit with the transistors if the entire bridge circuit is to be subjected to the low temperature being measured.

Having thus described the several useful and novel features of the self adjusting bridge circuit with negative feedback of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

What is claimed is:

1. A self adjusting bridge circuit comprising: a source of D.C. electrical power; a pair of voltage dividers connected in electrical parallel, said voltage dividers each comprising two series connected resistance members selected so that a voltage greater than zero exists continuously between the points intermediate the ends of said resistance voltage dividers; means connecting said voltage dividers in electrical parallel with said power source; first amplifying means having a current sensitive input interconnecting points intermediate the ends of said resistance voltage dividers so that a current greater than zero flows continuously between said intermediate points; negative current feedback means including a second amplifier having a current output; means interconnecting said second amplifier input and the output of said first amplifying means; and means connecting the output of said second amplifier to one of said intermediate resistance points so that the current flowing between said intermediate points tends to assume a constant value where said first amplifier means is a transistor having base, emitter and collector elements, said base and emitter elements being respectively connected to the said intermediate points.

2. The combination of claim 1 where the feedback amplifier is a transistor having base, emitter and collector elements, said base being connected to the collector of said first amplifier and the collector being connected to the emitter of the said first amplifier.

3. The combination of claim 2 where the feedback output circuit includes a current sensitive means in series therewith.

4. The combination of claim 2 and further including resistance means interconnecting said base and emitter elements in said feedback amplifier.

* * * * *